(12) United States Patent  (10) Patent No.: US 6,478,394 B1
Okamoto  (45) Date of Patent: Nov. 12, 2002

(54) PRINTING APPARATUS

(75) Inventor: Akira Okamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/276,509

(22) Filed: Mar. 25, 1999

(30) Foreign Application Priority Data

Mar. 26, 1998 (JP) .......................................... 10-079443
Mar. 15, 1999 (JP) .......................................... 11-069025

(51) Int. Cl.⁷ .......................... B41J 29/38; B41J 2/205; B41J 2/145; B41J 2/15
(52) U.S. Cl. ................................ 347/9; 347/15; 347/41
(58) Field of Search ................................ 347/9, 15, 41

(56) References Cited

U.S. PATENT DOCUMENTS

| | | | | |
|---|---|---|---|---|
| 4,313,124 A | | 1/1982 | Hara | 347/57 |
| 4,345,262 A | | 8/1982 | Shirato et al. | 347/10 |
| 4,459,600 A | | 7/1984 | Sato et al. | 347/47 |
| 4,463,359 A | | 7/1984 | Ayata et al. | 347/56 |
| 4,558,333 A | | 12/1985 | Sugitani et al. | 347/65 |
| 4,608,577 A | | 8/1986 | Hori | 347/66 |
| 4,723,129 A | | 2/1988 | Endo et al. | 347/56 |
| 4,740,796 A | | 4/1988 | Endo et al. | 347/56 |
| 5,604,520 A | * | 2/1997 | Matsubara et al. | 347/43 |
| 6,164,745 A | * | 12/2000 | Nagoshi et al. | 347/15 |

FOREIGN PATENT DOCUMENTS

| | | | |
|---|---|---|---|
| EP | 730973 | 9/1996 | ............ B41J/2/51 |
| EP | 798663 | 10/1997 | .......... G05K/15/10 |
| JP | 54-56847 | 5/1979 | ............ B41M/5/26 |
| JP | 59-123670 | 7/1984 | ............. B41J/3/04 |
| JP | 59-138461 | 8/1984 | ............. B41J/3/04 |
| JP | 60-71260 | 4/1985 | ............. B41J/3/04 |

* cited by examiner

Primary Examiner—John Barlow
Assistant Examiner—Alfred Dudding
(74) Attorney, Agent, or Firm—Fitzpatrick, Cella, Harper & Scinto

(57) ABSTRACT

In a printing apparatus according to the present invention, printing mask generating a plurality of thinning patterns is divided into thinning patterns having equal length in an auxiliary scanning direction. Dots of the printing mask are arranged for completing an image of a predetermined area on a printing medium while covering all dots with respective thinning patterns in just proportion. The thinning patterns are arranged while shifting in the same direction with spaced apart by constant intervals so that a plurality of boundary portions formed by scanned images adjacently located with each other in the auxiliary scanning direction, are located at different positions in the auxiliary scanning direction. The apparatus according to the present invention can improve image quality in the connection portion without lowering a printing speed.

22 Claims, 14 Drawing Sheets

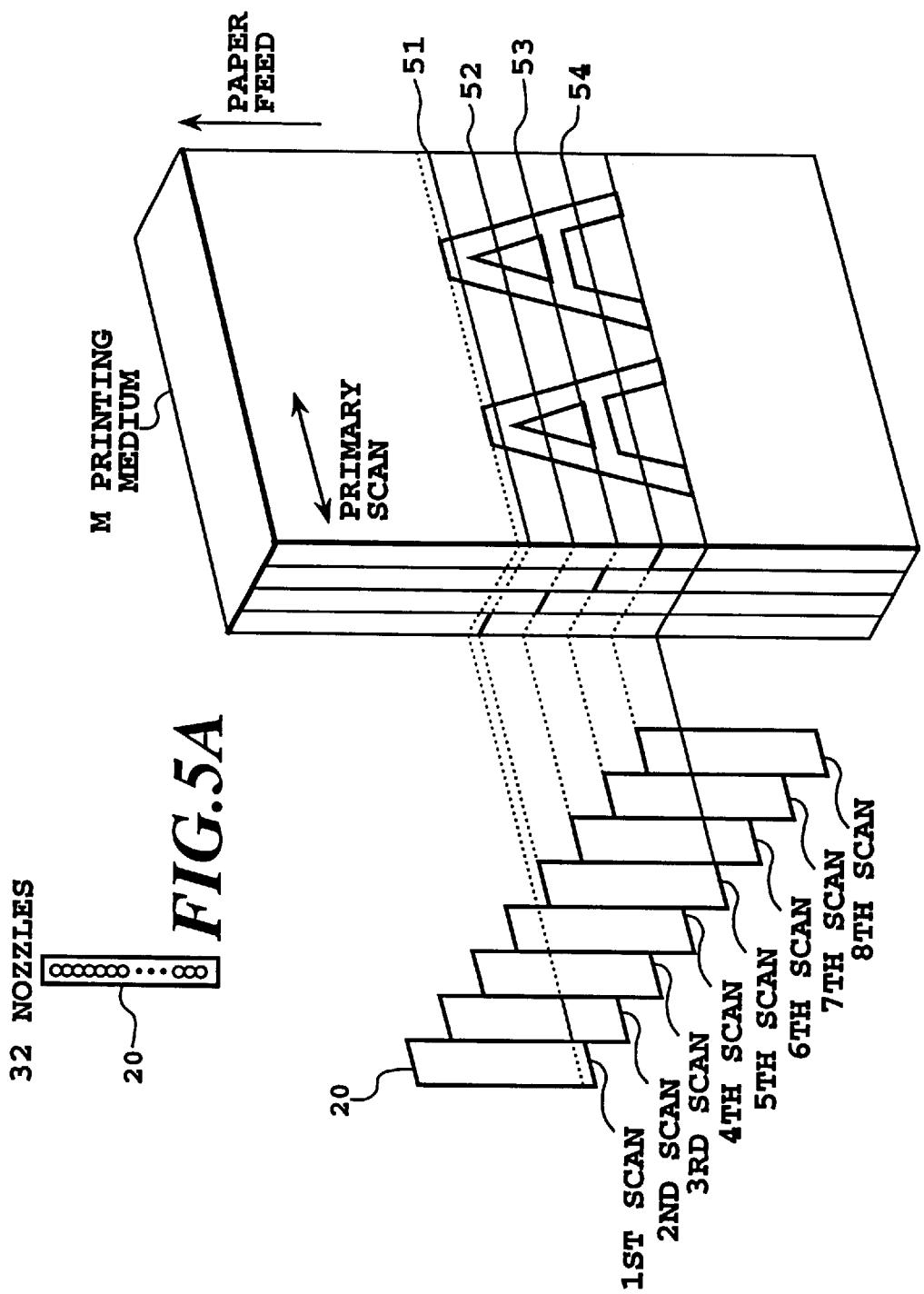

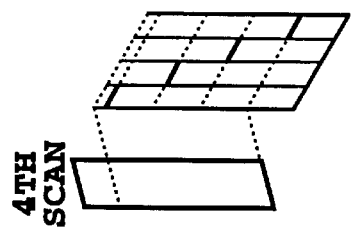
FIG.6A
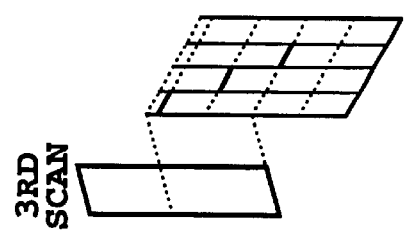
FIG.6B
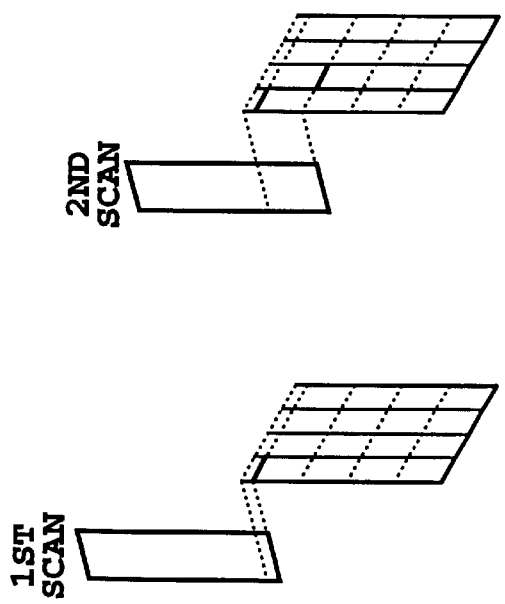
FIG.6C
FIG.6D
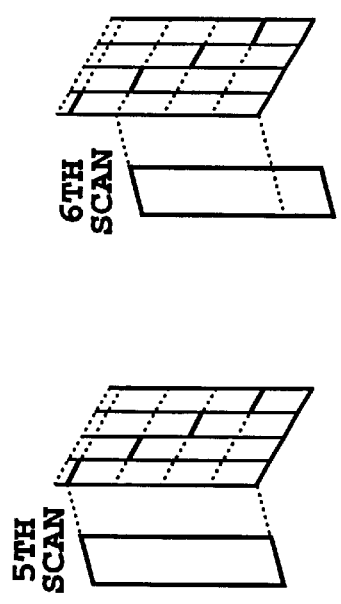
FIG.6E
FIG.6F
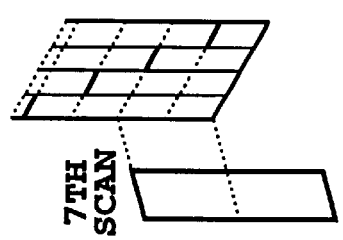
FIG.6G
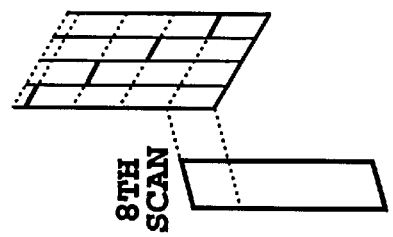
FIG.6H

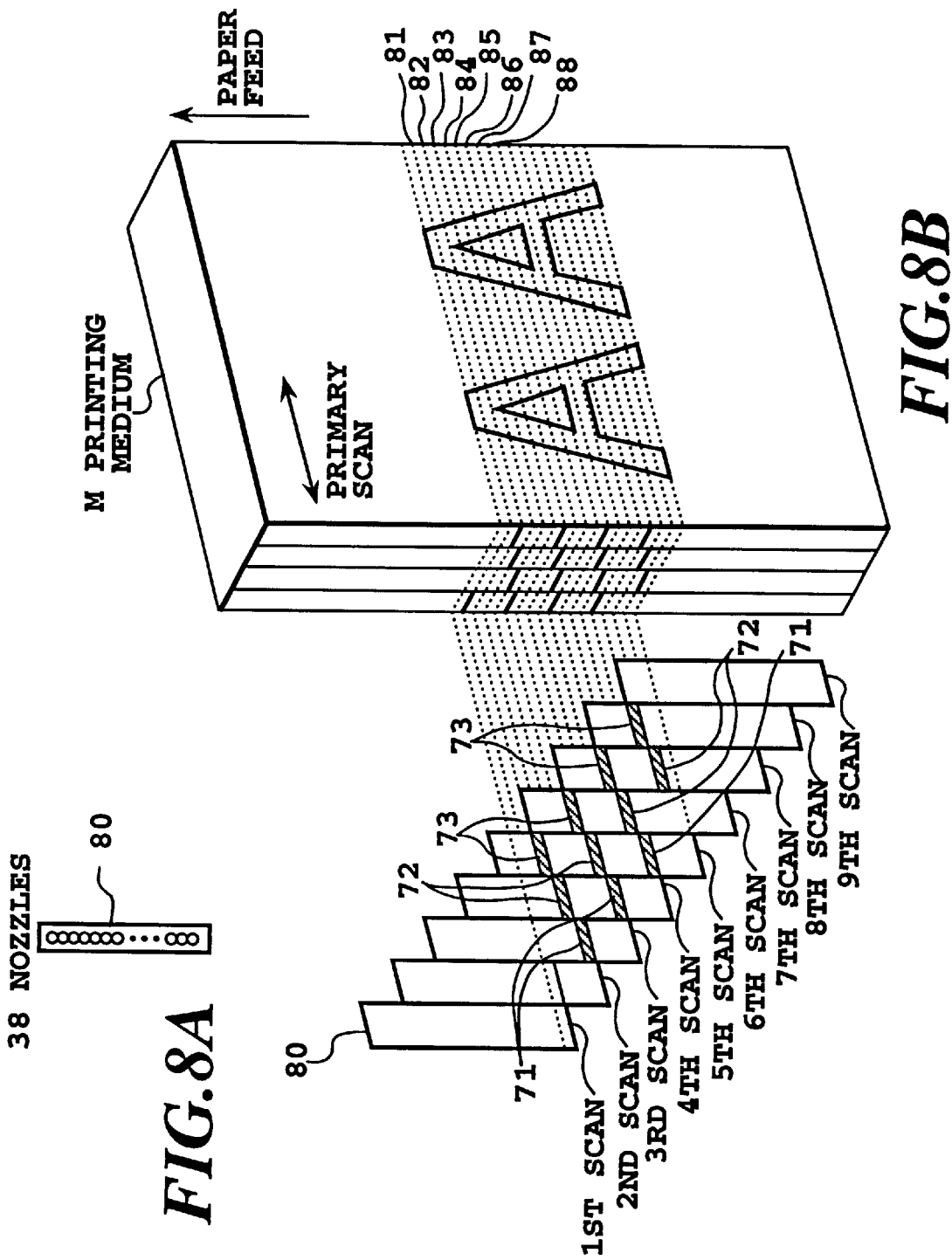

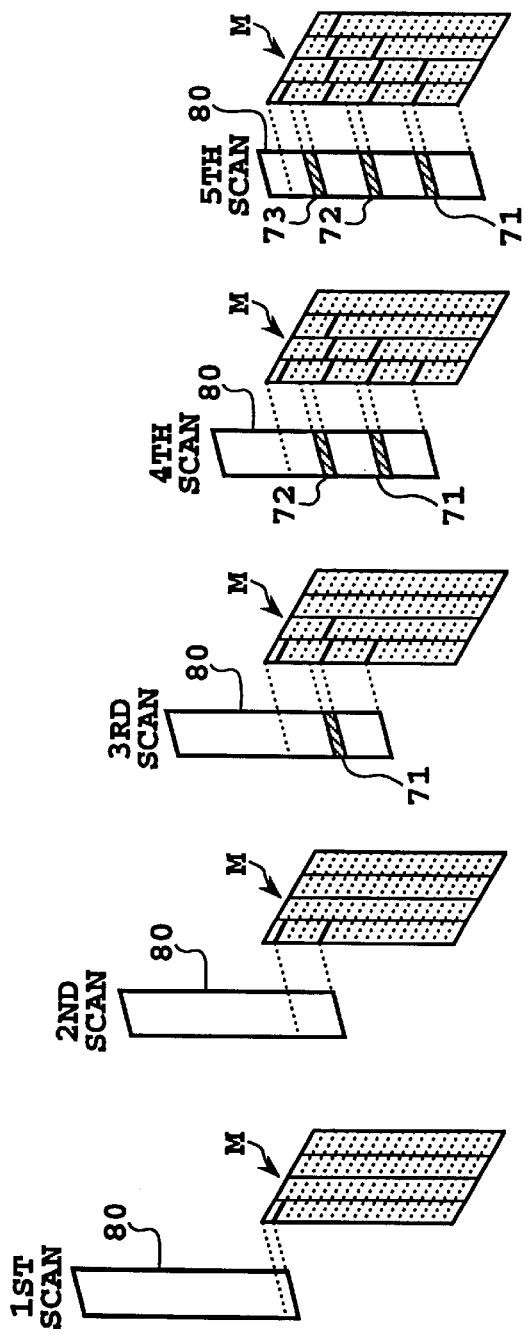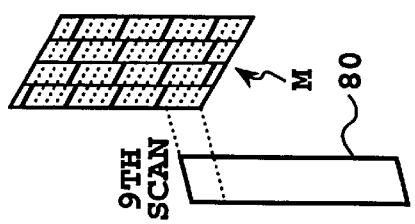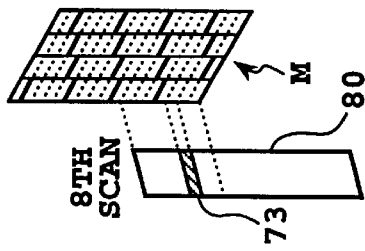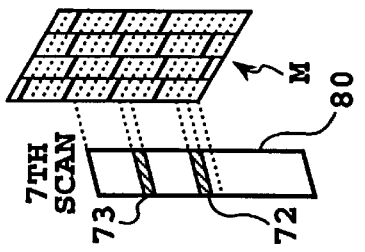

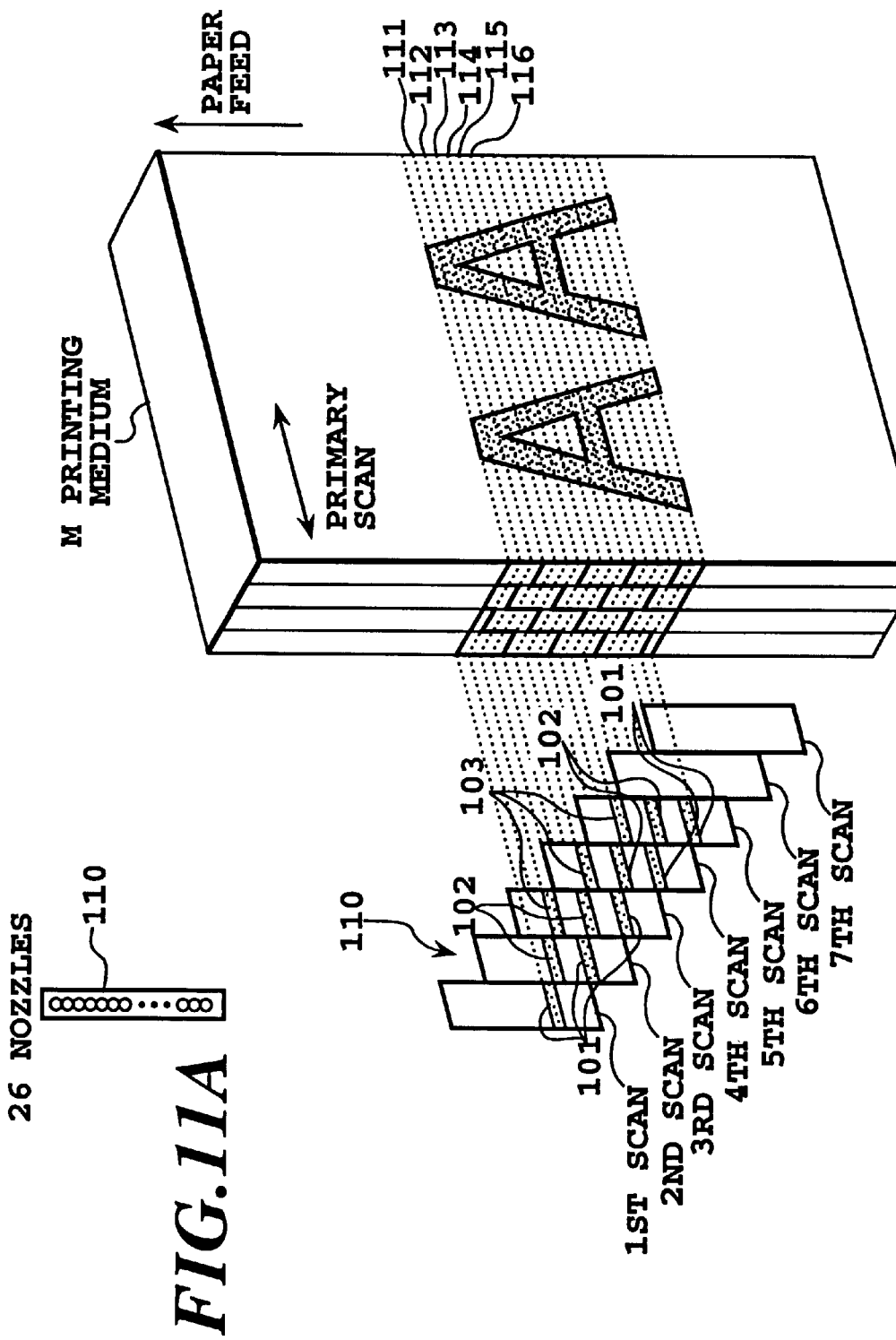

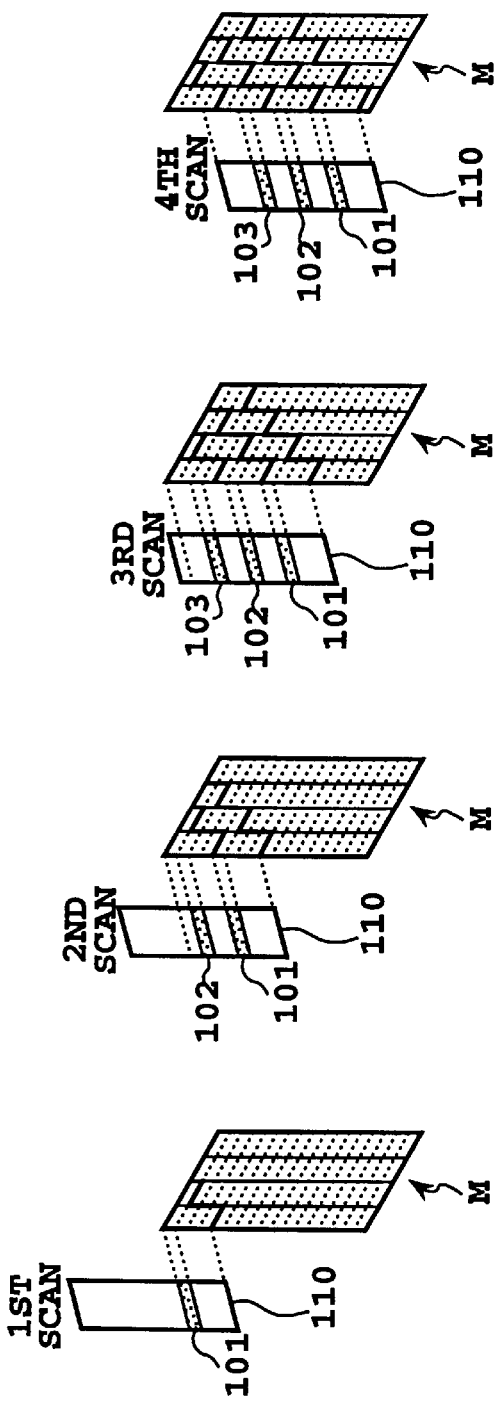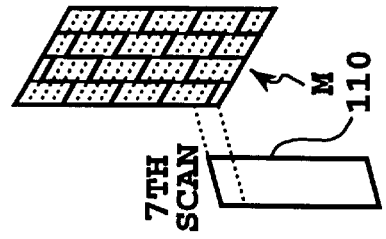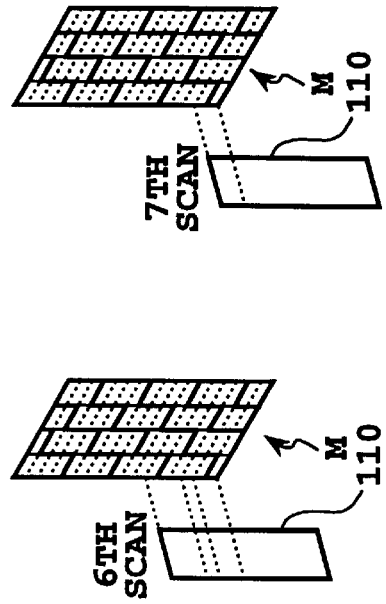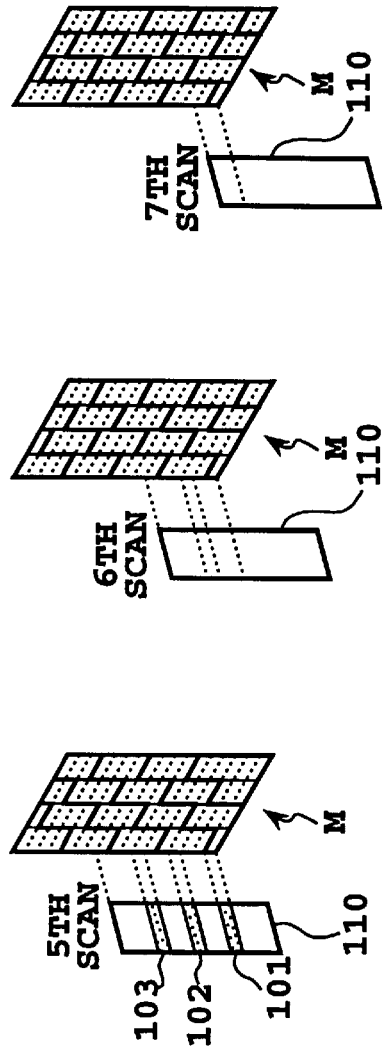

PRINTING APPARATUS

This application is based on Japanese Patent Application No. 10-079443 filed Mar. 26, 1998 and Japanese Patent Application No. 11-69025 filed Mar. 15, 1999, the contents of which are incorporated hereinto by reference.

BACKGROUND OF THE INVENTION

1. Field of the Invention

The present invention relates generally to a printing apparatus. More particularly, the invention relates to a printing apparatus which performs a plurality of scans, while relatively shifting a printing medium and a printing head for respectively predetermined amounts (multi-pass printing), to complete an image.

2. Description of the Related Art

A printing head of an ink-jet printer has a large number of nozzles aligned in a paper feeding direction. Performing a scanning operation (a primary scan), with an ink ejection while the printing head is driven to move in a direction (a primary scanning direction) different from a nozzle alignment direction, and a paper feeding operation (an auxiliary scan), for respectively predetermined amounts, repeatedly for a plurality of times, completes an image of one area. However, due to hitting position error to be caused by fluctuation of an ink ejection amount, fluctuation of a paper feeding amount, kink of the nozzles (error in forming positions) and so on, and due to ink absorption properties of a printing medium, a printed image can be formed accompanied with irregular color or stripes in a lateral direction.

As a solution for the problem set forth above, there has been known a multi-pass printing, such as two-pass printing or four-pass printing. In the four-pass printing, for example, the paper feeding amount is set at one fourth of a maximum width printed by one scan with the printing head, and one fourth of dots included within the scanning width are printed in each scan. Thus, four times scanning completes all of dots which included in one printing region of a longitudinal width corresponding to the paper feeding amount.

Connecting stripes formed, between printing regions, in the primary scanning direction and in the multi-pass printing employing with the thinned patterns, are so visually perceptible that image quality is to be degraded. In the multi-pass printing, connecting stripes in the primary scanning direction between printing regions formed by the thinned patterns becomes visually perceptible to degrade image quality. One reason for such connecting stripes is paper feeding error which constantly occurs. The feeding error in constant can be caused due to difference in thickness at paper ends, or due to error in a diameter of a paper feeding roller. An alternative reason to the paper feeding error of the connecting stripes may also be scattering of a nozzle pitch about a design value.

FIG. 1 shows a system configuration of a conventional printer.

In FIG. 1, a printer 10 is provided with interconnected components, an interface(I/F) 11, a CPU 12, a ROM 13, a RAM 14 and a print control unit 15, and performs printing in communication with a host computer(PC) 18.

The ROM 13 has a control program storage area 13a and a printing mask storage area 13b, and preliminarily stores a control program of the printer 10 and several printing masks which the printer 10 uses. The CPU 12 operates according to the control program stored in the control program storage area 13a to generate the printing masks to be used in a current printing mode. The RAM 14 has a printing buffer 14a and a printing mask storage area 14b to store printing data and the printing masks to be used in the current printing mode. The print control unit 15 controls a printing head (see FIG. 5A) having thirty-two nozzles for ink ejection.

FIG. 2 shows a side elevation of an essential part of the conventional printer.

A paper feeding device 22 is to perform the paper feeding operation. Here, the paper feeding operation means transporting of a printing medium M in an arrow A direction (the auxiliary scan). A printing head 20 is to perform the scanning operation (the primary scan). The scanning operation represents an ink ejection while shifting the printing head 20 in arrow B and/or C direction. The printer 10 carries out the multi-pass printing on the printing medium M while performing the paper feeding operation and the scanning operation repeatedly. It should be noted that relatively moving, in the two directions, of the printing medium M and the printing head 20 can accomplish the primary scan and auxiliary scan both.

The printing head 20 has a plurality of nozzles (not shown) aligned in the paper feeding direction. The printing head 20 is a so-called ink-jet head, in which a heater (not shown) is provided in a liquid path of each nozzle for ink ejection for printing, which is achieved by film boiling of the ink, within the liquid path, caused by driving the heater to generate thermal energy, based upon image data.

A printing process by the printer 10 will be explained.

At first, the host computer 18 performs designation of a printing mode via an interface. The CPU 12 retrieves the printing mask to be used in the current printing from the ROM 13 according to the designated printing mode to extend the printing mask in the printing mask storage area 14b of the RAM 14. The printer 10 receives the printing data to extend bitmap data in the printing buffer 14a.

Whenever a predetermined amount of the bitmap data is stored in the printing buffer 14a, the CPU 12 issues a printing instruction to the print control unit 15. The print control unit 15 drives the heater with the designated bitmap and the extended printing mask in order to eject the ink to the printing medium.

FIG. 3 shows one example of the conventional printing mask for accomplishing four-pass printing with the printing head.

A printing mask 30 is of a size of 32 dots, corresponding to number of nozzle in the paper feeding direction, by 36 dots in the primary scanning direction. All dots of the printing mask can be applicable to the ink ejection with combined values of (A-x, B-x, C-x, D-x) (1<x<8). The dots are arranged in such a way that an image of an area on the printing medium is completed by scanning the same area respectively with each of area A, B, C, D. A printing ratio in each area A, B, C, D is set at 25%. Namely, for hatched dots, the ink ejection is effective.

Operation of the print control unit 15 employing with the printing mask set forth above will be explained with reference to FIGS. 1 and 4.

The print control unit 15 retrieves bitmap data 400 in a printing buffer 14a and a printing mask 42 in the printing mask storage area 14b in sequential order, and an AND operation of both is carried out. In the printing mask 42, when the dot is once retrieved up to the final dot, the dot retrieving address returns to the beginning. On the basis of the AND operation result, the effectiveness of the data is determined in order to perform the ink ejection according to the effective data while scanning the printing medium M with the printing head 20.

A completing process of the image by four-pass printing while repeating the paper feeding operation by a prescribed quantity corresponding to 8 nozzles, will be explained with reference to FIGS. 5B, and 6A to 6H. FIG. 5B shows an image printing result by the multi-pass printing while employing the printing head 20, the nozzle construction of which is shown in FIG. 5A. FIGS. 6A to 6H show a forming process of the connection stripes by every scan.

The printer 10 performs the paper feeding for eight nozzles and the scanning repeatedly. Thus, four times of scan completes the image, in each of which scan one fourth of the printing data is used, respectively.

Here, it is assumed that the paper feeding operation of the printer 10 causes a paper feeding error in feeding amount in short of 1%.

Under these conditions, connecting stripes 51 of FIG. 5B are formed by a first scan scanning the upper region in the drawing to a fifth scan scanning the lower region in the drawing, through the process of FIGS. 6A to 6E. The paper feeding amount to be performed between the first scan and the fifth scan corresponds to thirty-two nozzles width caused by four times of paper feeding operation. Therefore, a shortage amount corresponding to 0.32 nozzles caused by the paper feeding operation yields an offset amount of the image to be formed by the fifth scan relative to that should be. An overlap of the offset amount, caused by the image formed in the fifth scan and the image formed in the first scan, yields connecting stripes 51.

Concerning a connection portion 52, similar connecting stripes 52 are formed through the process of FIGS. 6B to 6F in the similar mechanism. Similarly, concerning a connection portion 53, similar connecting stripes 53 are formed through the process of FIGS. 6C to 6G in the similar mechanism. Also, concerning a connection portion 54, similar connecting stripes 54 are formed through the process of FIGS. 6D to 6H in the similar mechanism.

As set forth above, density of the connecting stripes depends on the paper feeding amount with every scan during multi-pass printing. Accordingly, in order to prevent degradation of the image quality with eliminating the connecting stripes, a method of decreasing unit amount of paper feeding has been taken conventionally. For example, a method of reducing paper feeding operation to four nozzles width employing with the printing mask for feeding for four nozzles width. The method described above can make it possible to reduce the offset amount at the connection portion to be half, i.e. 0.16 nozzles.

Dispersion of an ink can be another cause of connecting stripes formation in the connection portion. In the multi-pass printing, a condition where ratios of printed dots before and after the connection portion are constantly different, is caused during printing process. While this condition is caused, dispersion of the ink from a region having greater ratio of printed dots to a region having smaller ratio of printed dots is continuously caused, coloring agent in the ink may be accumulated in the connection portion due to surface tension, or, in the alternative, the coloring agent in the ink may flow away from the connection portion. As a result, a phenomenon that color development of the ink in the connection portion becomes different from that in other regions to form the connecting stripes, is caused.

This phenomenon will be explained with reference to FIG. 5B.

Since the first scan of the printing head 20 performs printing only in the upper region of the connecting stripes 51, difference in the ratio of the printed dots is caused about this portion. The difference about this portion cannot be resolved even by performing the second, third and fourth scans, but can be resolved by the fifth scan. Therefore, during a period from the first scan to the fifth scan, the connecting stripes 51 is continuously formed.

For preventing the degradation of the image quality due to the connecting stripes formed as above, it becomes necessary to cut down the period where the difference between the ratios of the printed dots is maintained. However, in the conventional multi-scan method, it has not been possible to perform printing for resolving the difference between the ratios of the printed dots before completion of the image. Therefore, a technique to make the unit amount of paper feeding in the auxiliary scan to shorten the formation interval of the connecting stripes is used to make the connecting stripes not so visually perceptible.

However, in the prior art set forth above, printing speed can be lowered by setting the unit amount of paper feeding smaller. Therefore, there arose a problem that simply increasing number of nozzles cannot achieve rising up printing speed while outputting prints with high quality.

SUMMARY OF THE INVENTION

The present invention is worked out in view of the drawbacks in the prior art as set forth above. Therefore, it is an object of the present invention to provide a printing apparatus which can reduce connecting stripes without causing lowering of a printing speed by reducing the unit amount of paper feeding.

A printing apparatus, a printing head, a head cartridge and a control method for controlling a printing apparatus, according to the present invention accomplish that; in a printing apparatus comprising an auxiliary scanning means for relatively moving a printing head having a plurality of nozzles aligned in an auxiliary scanning direction and a printing medium substantially in the auxiliary scanning direction for a predetermined amount, and a primary scanning means for relatively moving the printing head and the printing medium in a primary scanning direction different from the auxiliary scanning direction; a plurality of images may be printed on the printing medium by the printing head employing with respective of a plurality of thinning patterns and an image on the printing medium may be formed by combining the plurality of images. The image is formed in such a manner that a plurality of boundary portions of images on the printing medium, formed adjacently with each other in the auxiliary scanning direction by respective of the thinning patterns, are located at different positions in the auxiliary scanning direction.

Hence, the above present inventions can output a high quality image at high speed while reducing a predetermined amount in shifting the printing medium, without lowering an output speed.

Furthermore, a printing apparatus according to the present invention, in performing printing operation while scanning a plurality of times by a printing head having a plurality of nozzles with thinning image data, generates a plurality of thinning patterns each having substantially the same ejection ratio and a length in the auxiliary scanning direction corresponding to the predetermined amount, which completes an image of the predetermined area by combining images formed with respective of the thinning patterns respectively; and shifts the plurality of thinning patterns in such a manner that a plurality of boundary portions of images formed by respective of the thinning patterns adjacently located with each other in the auxiliary scanning direction on the printing medium are located at different positions in the auxiliary scanning direction.

Hence, as connection portions of respective scanned images are not consistent with on the printing medium in the above present invention, a high quality image can be outputted at high speed while reducing a predetermined amount in shifting the printing medium, without lowering the output speed.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 5A and 5B are explanatory illustration showing a process of the conventional four-pass printing;

FIGS. 6A to 6H are explanatory illustration showing a process of the conventional four-pass printing;

FIGS. 8A and 8B are explanatory illustrations showing a printing process of the printing apparatus in the first embodiment according to the present invention;

FIGS. 9A to 9I are explanatory illustrations showing a printing process of the printing apparatus in the first embodiment according to the present invention;

FIGS. 11A and 11B are explanatory illustrations showing a printing process of the printing apparatus in the second embodiment according to the present invention;

FIGS. 12A to 12G are explanatory illustrations showing a printing process of the printing apparatus in the first embodiment according to the present invention;

DESCRIPTION OF THE PREFERRED EMBODIMENTS

The preferred embodiments of the printing apparatus according to the present invention will be described in detail with reference to the drawings.

Figure 1:
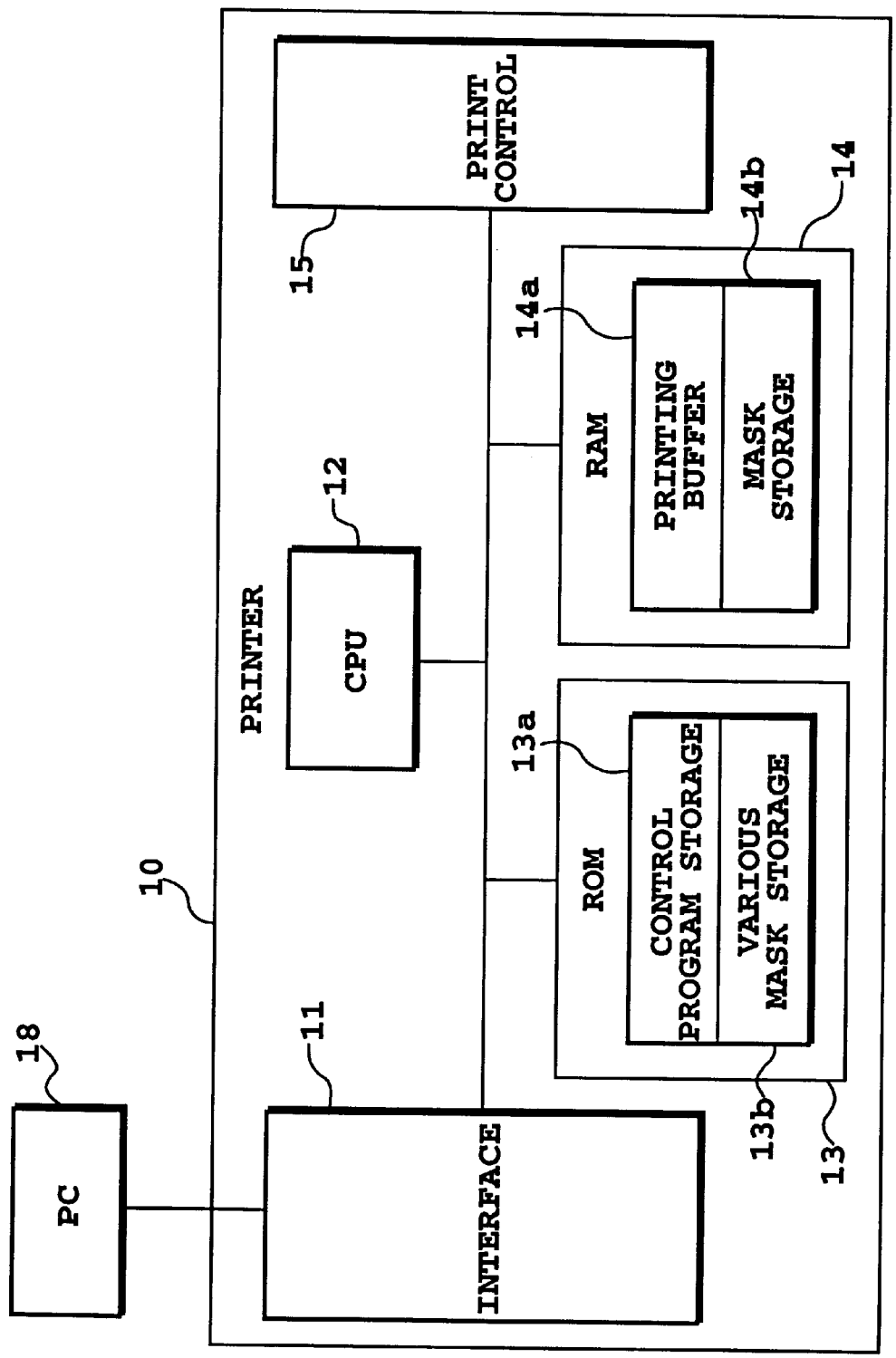
FIG. 1 is a block diagram showing a configuration of the conventional printing apparatus.
Figure 2:
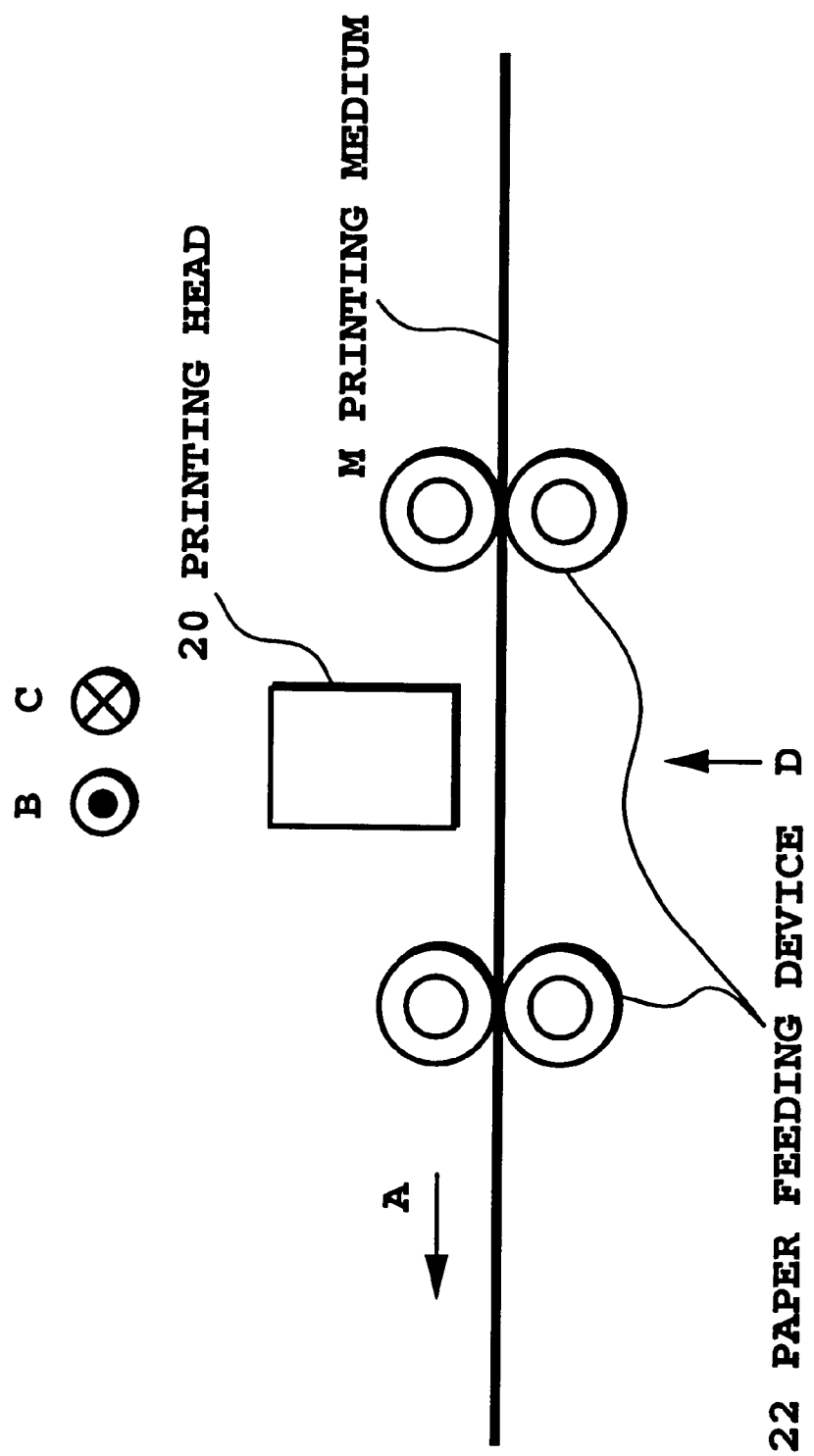
FIG. 2 is a side elevation showing the configuration of an essential part of the conventional printing apparatus.

A printing apparatus according to the present invention is accomplished by performing particular process of a CPU according to a control program employing with a hardware configuration constructed similarly to those shown in FIGS. 1 and 2.

(First Embodiment)

The shown embodiment is directed to an embodiment employing a monochrome-type printing head having thirty-eight nozzles (see FIG. 8A).

Figure 3:
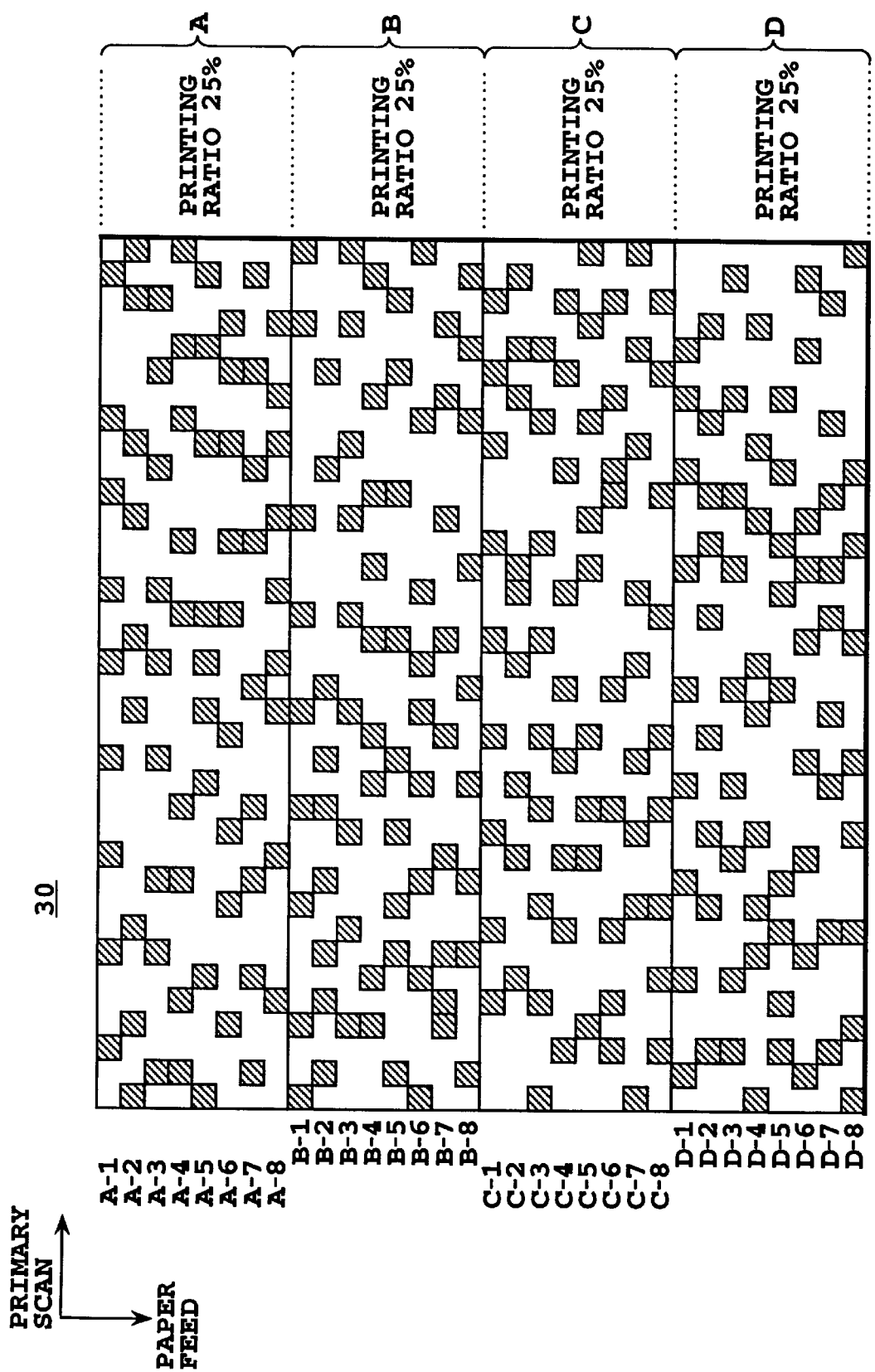
FIG. 3 is an illustration showing a pattern of the printing mask to be used in the conventional four-pass printing.
Figure 7:
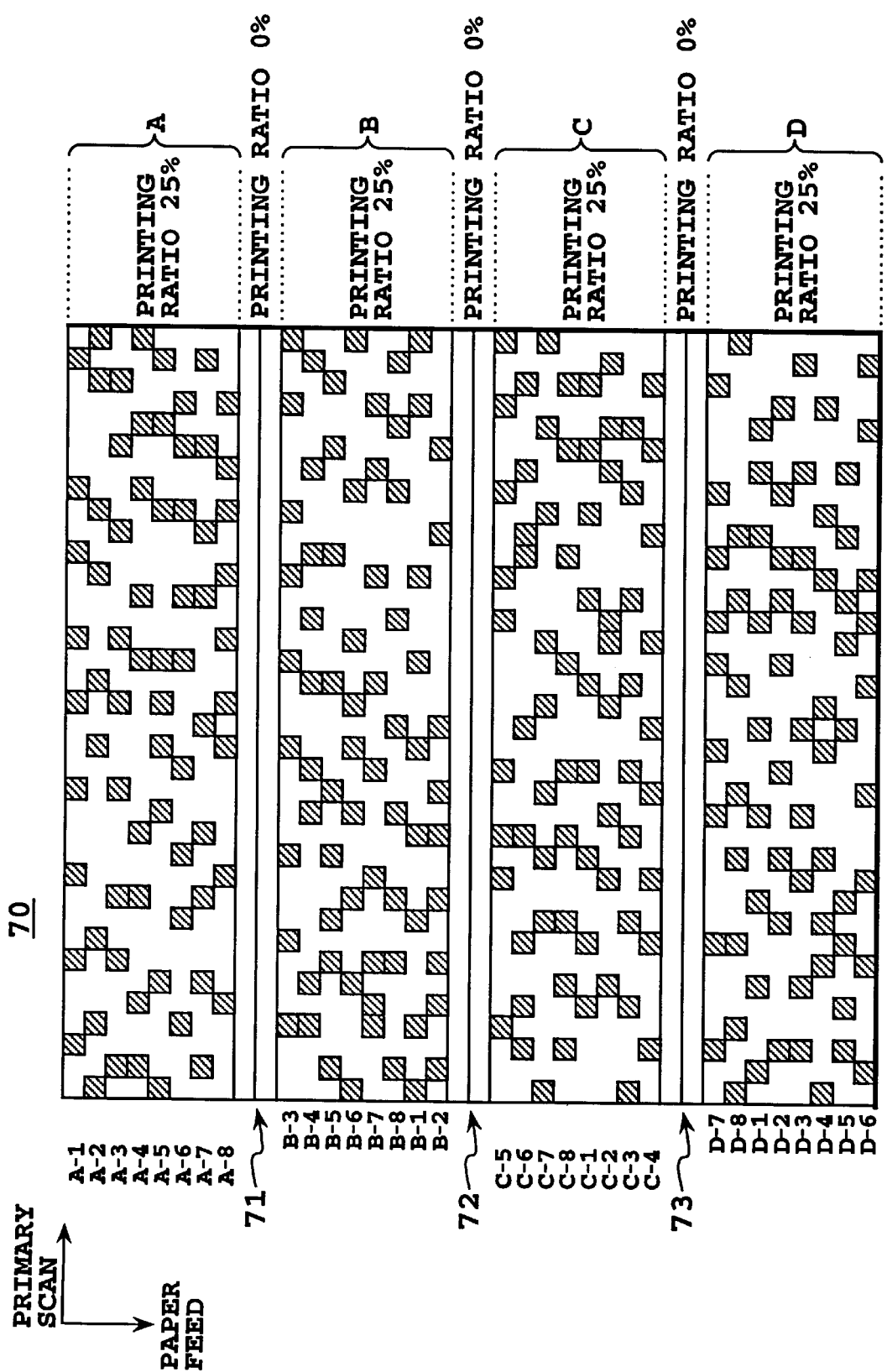
FIG. 7 is a pattern chart of the printing mask to be used in the first embodiment of a printing apparatus according to the present invention.

A printing mask 70 of the shown embodiment illustrated in FIG. 7 is prepared by dividing the conventional printing mask shown in FIG. 3 into thinned patterns A, B, C, D per 8 dots of paper feeding width during printing. These patterns A, B, C, D are arranged while shifting in the same direction for two dots of spaces provided between the adjacent patterns so that adjacent connection portions do not match on the printing medium (located at different positions) and in equal interval.

Printing ratio in the patterns A, B, C, D is one fourth (25%) respectively, and printing ratio in gaps 71, 72, 73 formed between the patterns is zero, smaller than that in the patterns.

The printing mask 70 to be used in the shown embodiment is of a size of thirty-eight dots corresponding to the number of nozzles in the paper feeding direction, by thirty-six dots in the primary scanning direction. The dots of the printing mask 70 are arranged in such a way that all the dots can be applicable to the ink ejection with combined values of (A-x, B-x, C-x, D-x) ($1<x<8$).

A process of thinning printing based on AND operation with the printing mask 70 employed with the shown embodiment, in which process an image is completed by four-pass printing while repeating paper feeding operation for eight nozzles, will be explained with reference to FIGS. 8B, and 9A to 9I. FIG. 8B shows an image printing result by the multi-pass printing employing with the printing head 80, the nozzle construction of which is shown in FIG. 8A. FIGS. 9A to 9I show a formatting process of the connecting stripes with every one scan. In FIGS. 8B and 9A to 9I, the hatched portion is masked by the gaps 71, 72, 73 of FIG. 7, where the ejection ratio (printing ratio) is zero.

The printer 10 performs the paper feeding for eight nozzles and the scanning repeatedly in similar manner as those illustrated in FIGS. 3A to 3I. As shown in these figures, four times of scan in all completes the image, in each of which scan one fourth of the printing data is respectively used.

Here, it is assumed that the paper feeding operation of the printer 10, similarly to the foregoing, causes the paper feeding error in feeding amount in short of 1%.

Under these conditions, connecting stripes 81 of FIG. 8B are formed by a connection of a first scan scanning the upper region in the drawing to a second scan scanning the lower region in the drawing. The printing mask 70 are formed so that connecting stripes of the image by other scans will never be formed at the connection part of the first and second scans. The paper feeding amount to be performed between the first scan and the second scan corresponds to eight nozzles width caused by one time of paper feeding operation. Therefore, a shortage amount corresponding to 0.08 nozzles caused by the one time of paper feeding operation yields an offset amount of the image to be formed by the second scan relative to that should be. An overlap of the offset amount, caused by the image formed in the second scan and the image formed in the first scan, yields connecting stripes 81.

Concerning a connection portion 82, connecting stripes 82 are formed similarly by overlapped images formed in the second and third scans through the process of FIGS. 3B and 3C, in the similar mechanism. Also, concerning a connection portion 83, connecting stripes 83 are formed similarly by overlapped images formed in the third and fourth scans through the process of FIGS. 3C and 3D, in the similar mechanism. Furthermore, concerning a connection portion 84, connecting stripes 84 are formed similarly by overlapped images formed in the fourth and fifth scans through the process of FIGS. 3D and 3E, in the similar mechanism. Also, concerning a connection portion 85, connecting stripes 85 are formed similarly by overlapped images formed in the fifth and sixth scans through the process of FIGS. 3E and 3F, in the similar mechanism.

Concerning a connection portion 86, connecting stripes 86 are formed similarly by overlapped images formed in the sixth and seventh scans through the process of FIGS. 3F and 3G, in the similar mechanism. Concerning a connection portion 87, connecting stripes 87 are formed similarly by overlapped images formed in the seventh and eighth scans through the process of FIGS. 3G and 3H, in the similar mechanism. Concerning a connection portion 88, connecting stripes 88 are formed similarly by overlapped images formed in the eighth and ninth scans through the process of FIGS. 3H and 3I, in the similar mechanism. Subsequently, similarly, reduced connecting stripes are formed in equal interval.

The shortage amount of paper feeding corresponding to 0.08 nozzles is reduced to one fourth of the 0.32 nozzles width shortage in paper feeding amount in conventional four-pass printing with eight nozzles. The above described reduction significantly improves the connecting stripes. Furthermore, an interval between the connecting stripes can be narrowed to two nozzle interval from the conventional eight nozzle interval. Since the connecting stripes will become visually not perceptible for the human eye by making the interval quite narrow, even in view of this, image quality can be improved.

Further in an aspect of the ink dispersion, on the other hand, an effect of reducing connecting stripes can be expected. Namely, in the above shown embodiment, the difference between the ratios of the printed dots in the connecting stripes of FIG. 8B is caused by performing the first scan, but can be resolved in a short period by performing the second scan. The difference between the ratios of the printed dots in the connecting stripes 82 is caused by performing the fifth scan, but can be resolved in a short period by performing the sixth scan. Similarly, concerning other connecting stripes, the difference between the ratios of the printed dots is caused at certain scan but resolved in a short period by performing the next scan.

In contrast to this, in the conventional four-pass printing, the difference between the ratios of the printed dots caused by the first scan cannot be resolved until the fifth scan is completed.

As set forth above, the above shown embodiment can also reduce the connecting stripes due to dispersion ability of the ink. The embodiment is remarkably effective, together with reduction in shortage amount of paper feeding and shortening of the interval between the connecting stripes, in restricting the connecting stripes.

(Second Embodiment)

The shown embodiment is directed to an embodiment employing a monochrome-type printing head having twenty-six nozzles(see FIG. 11A).

Figure 10:
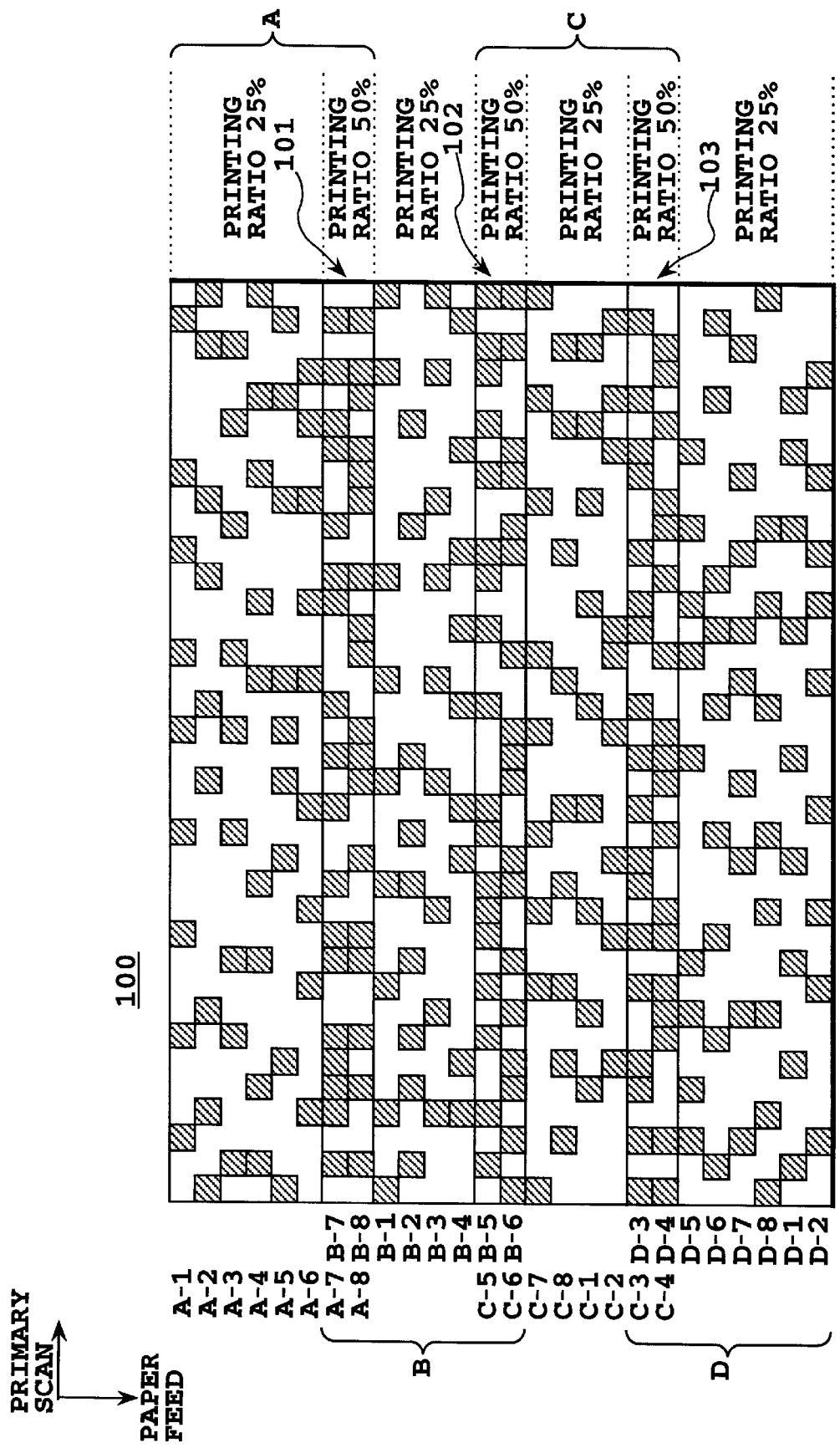
FIG. 10 is a pattern chart of the printing mask to be used in the second embodiment of a printing apparatus according to the present invention.

A printing mask 100 of the shown embodiment as illustrated in FIG. 10 is prepared by dividing the conventional printing mask shown in FIG. 3 into thinned patterns A, B, C, D per 8 dots of paper feeding width during printing. These patterns A, B, C, D are arranged while shifting in the same direction for two dots of overlapped area provided between the adjacent patterns so that adjacent connection portions do not match on the printing medium (located at different positions) and in equal interval.

A printing ratio in the patterns A, B, C, D is one fourth (25%), respectively. A printing ratio in overlapping parts 101, 102, 103, which are formed of respective patterns overlapping, are one half (50%), greater than that in the patterns.

The printing mask 100 to be used in the shown embodiment is of a size of 26 dots corresponding to the number of nozzles in the paper feeding direction, by 36 dots in the primary scanning direction. The dots of the printing mask 100 are arranged in such a way that all the dots can be applicable to the ink-droplets ejection with combined values of (A-x, B-x, C-x, D-x) (1<x<8).

A process of thinning printing based on AND operation with the printing mask 100, in which process an image is completed by four-pass printing while repeating paper feeding operation for eight nozzles, will be explained with reference to FIGS. 11B, 12A to 12I. Upon performing thinning printing based on AND operation with the printing mask 100, a three-pass printing area and a four-pass printing area occurs.

A process of completing an image with this printing mask while repeating paper feeding operation for eight nozzles, will be explained with reference to FIGS. 11B and 12A to 12G. FIG. 11B shows an image printing result by the multi-pass printing while employing a printing head 110, the nozzle construction of which is shown in FIG. 11A. FIGS. 12A to 12G show a forming process of the connecting stripes with every one scan. In FIGS. 11B and 12A to 12G, the hatched portion is masked by the overlapping parts 101,102, 103 of FIG. 10, where the ejection ratio (printing ratio) is one half.

The printer 10 performs the paper feeding for eight nozzles and the scanning repeatedly. Thus, either four times of scan, in all, with one fourth of the printing data in each scan, or three times of scan in all, namely one scan with one half of the data and two scans with one fourth of the data, completes the image.

Here, it is assumed that the paper feeding operation of the printer 10, similarly to the foregoing, causes the paper feeding error in feeding amount in short of 1%.

Under these conditions, connecting stripes 111 of FIG. 11B are formed by a connection of a first scan, which scans the upper region and the lower region in the drawing with printing ratio of higher value in the upper than in the lower, to a second scan, which scans the upper region and the lower region in the drawing with printing ratio of higher value in the lower than in the upper. The printing mask 100 are formed so that connecting stripes of the image by other scans will never be formed at the connection part of the first and second scans. Namely, in the first scan, the lower region of the part in the drawing is scanned at a printing ratio of one fourth, and the upper region of the part in the drawing is scanned at a printing ratio of one half. On the other hand, in the second scan, the lower region of the part in the drawing is scanned at the printing ratio of one half, and the upper region of the part in the drawing is scanned at the printing ratio of one fourth to form the image in each scan. Therefore, a shortage amount corresponding to 0.08 nozzles caused by the one time of paper feeding operation yields an offset amount of the image to be formed by the second scan relative to that should be. An overlap of the offset amount, caused by the image formed in the second scan and the image formed in the first scan, yields connecting stripes 111.

Concerning a connection portion 112, connecting stripes 112 are formed similarly by overlapped images formed in the second and third scans through the process of FIGS. 12B and 12C, in the similar mechanism. Also, concerning a connection portion 113, connecting stripes 113 are formed similarly by overlapped images formed in the third and fourth scans through the process of FIGS. 12C and 12D, in the similar mechanism. Furthermore, concerning a connection portion 114, connecting stripes 114 are formed similarly by overlapped images formed in the fourth and fifth scans through the process of FIGS. 12D and 12E, in the similar mechanism. Also, concerning a connection portion 115, connecting stripes 115 are formed similarly by overlapped images formed in the fifth to sixth scans through the process of FIGS. 12E and 12F, in the similar mechanism. Concerning a connection portion 116, connecting stripes 116 are formed similarly by overlapped images formed in the sixth and seventh scans through the process of FIGS. 12F and 12G, in the similar mechanism. Subsequently, similarly, reduced connecting stripes are formed in equal interval.

The shortage amount of paper feeding corresponding to 0.08 nozzles is reduced to one fourth of the 0.32 nozzles width shortage in paper feeding amount in conventional four-pass printing with eight nozzles. The above described reduction significantly improves the connecting stripes. Furthermore, an interval between the connecting stripes can be narrowed to two nozzle interval from the conventional eight nozzle interval. Since the connecting stripes will become visually not perceptible for the human eye by making the interval quite narrow, even in view of this, image quality can be improved.

Further in the aspect of the ink dispersion, on the other hand, the effect of reducing connecting stripes can be expected. Namely, in the above shown embodiment, the difference between the ratios of the printed dots in the connecting stripes of FIG. 11B is caused by performing the first scan, but can be resolved in a short period by performing the second scan. The difference between the ratios of the printed dots in the connecting stripes 112 is caused by performing the second scan, but can be resolved in a short period by performing the third scan. Similarly, concerning other connecting stripes, the difference between the ratios of the printed dots is caused at certain scan but resolved in a short period by performing the next scan.

In contrast to this, in the conventional four-pass printing, the difference between the ratios of the printed dots caused by the first scan cannot be resolved until the fifth scan is completed.

As set forth above, the above shown embodiment can also reduce the connecting stripes due to dispersion ability of the ink. The embodiment is remarkably effective, together with reduction in shortage amount of paper feeding and shortening of the interval between the connecting stripes, in restricting the connecting stripes.

It should be noted that the present invention is applicable not only for the monochrome-type printing head, but also for color printing heads. In application to color heads, sizes of the gaps and overlapping parts are appropriately determined according to nozzle construction of respective colors.

Further, it may be possible to modify the embodiment so as to determine, by the CPU, whether the method according to the present invention is to be applied or not according to a kind of printing mediums. In such modification, printing is performed by the conventional printing method on such a printing medium not adapted for high definition printing, as paper, cloth and so on, and is performed by the method according to the present invention on such a printing medium adapted to high definition printing, as dedicated printing paper for high quality printing, glossy film or so on.

(Third Embodiment)

Figure 13:
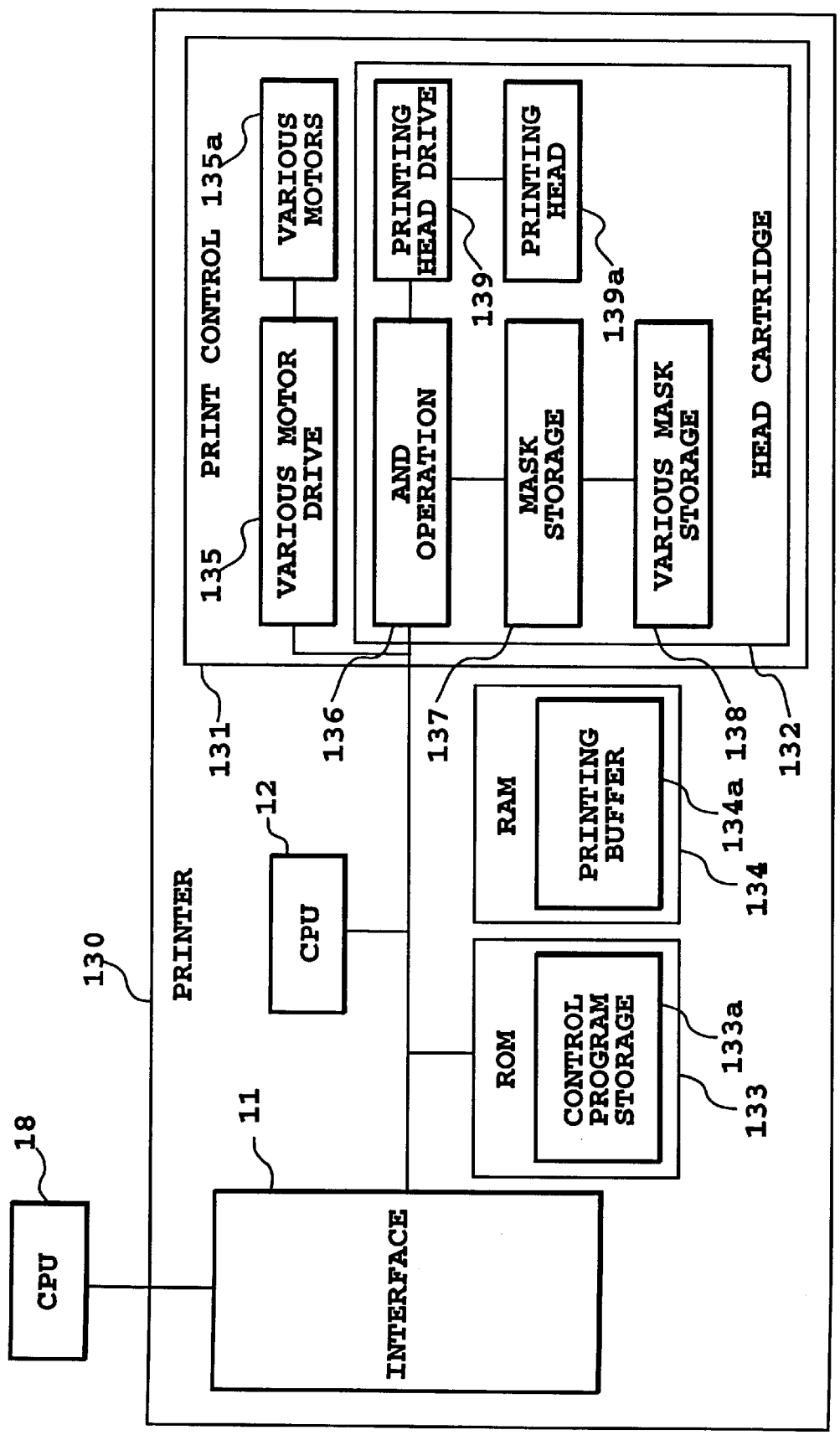
FIG. 13 is a block diagram showing a configuration of the third embodiment of the printing apparatus according to the present invention.

The shown embodiment exemplifies a case where a printing head cartridge which is detachable relative to a main body of the printing apparatus is provided with thinning patterns and a thinning means inside. FIG. 13 is a block diagram showing a configuration of the third embodiment of the printing apparatus according to the present invention. In FIG. 13, a head cartridge 132 has particular components to the present invention.

In FIG. 13, a printing apparatus 130 has the interface 11, the CPU 12, a print control unit 131, a ROM 133 and a RAM 134. The CPU 12 operates according to a control program preliminarily stored in a control program storage area 133a prepared in the ROM 133, and controls a printing operation.

On the other hand, the print control unit 131 has a various motor drive unit 135, various motors 135a driven for revolution by the drive unit 135, and the head cartridge 132. The cartridge 132 is a head/cartridge integrated type constructed for detachably loading in the printing apparatus 130, and has inside a printing head 139a integrated with an ink tank (not shown). The head cartridge 132 has a printing mask storage unit 137, a various printing mask storage unit 138, an AND operation unit 136, a printing head drive unit 139 and a fixed type printing head 139a to be driven by the drive unit 139. The various printing mask storage unit 138 preliminarily stores a plurality of printing masks, particular to the present invention as shown in FIGS. 7 and 10.

It should be noted that while the printing cartridge is detachable type and the printing head 139a in the head cartridge 132 is fixed type in the shown embodiment, the present invention is also applicable for a configuration of head separable type, in which the printing head can be separated from the printing cartridge.

According to the apparatus of the configuration shown in FIG. 13, the printing operation as will be described hereinafter, is performed.

The printing apparatus 130 is responsive to a printing instruction from the host computer 18, received through the interface 11, to retrieve a printing mask to be used in the current printing mode among a plurality of printing masks in the various printing mask storage unit 138 and to store the retrieved printing mask in the printing mask storage unit 137.

Subsequently, when printing data is transmitted to the printing apparatus 130 from the host computer 18, the printing apparatus 130 stores the printing data in a printing buffer 134a provided with the RAM 134. When the printing data for one scan is accumulated in the printing buffer 134a, the printing operation for one scan is performed under control of the print control unit 131. The printing data for one scan stored in the printing buffer 134a is fed to the AND operation unit 136 in the head cartridge 132. Then, in the AND operation unit 136, AND operation of the printing data for one scan and data of the printing mask stored in the printing mask storage unit 137 is performed, as described in connection with FIG. 4.

This AND operation achieves thinning particular to the present invention, and the printing data resulting from the AND operation is transmitted to the printing head drive unit 139. The printing head 139a is driven on the basis of the received printing data, and whereby the printing head 139a performs printing of one scan according to the thinning printing data. The cartridge 132 is a head/cartridge integrated type constructed for detachably loading in the printing apparatus 130, and has inside a printing head 139a integrated with an ink tank (not shown).

The printing operation and printing result to be accomplished by the printing apparatus incorporating the above-mentioned thinned pattern and the thinning means inside the printing cartridge are similar to those in the first and second embodiments. According to the above shown embodiment, exchanging the printing cartridge can achieves an improvement of the multi-pass printing method without any variation of the configuration of the printing apparatus, and the improvement yields reduction of the connecting stripes in the multi-pass printing process.

(Fourth Embodiment)

Figure 14:
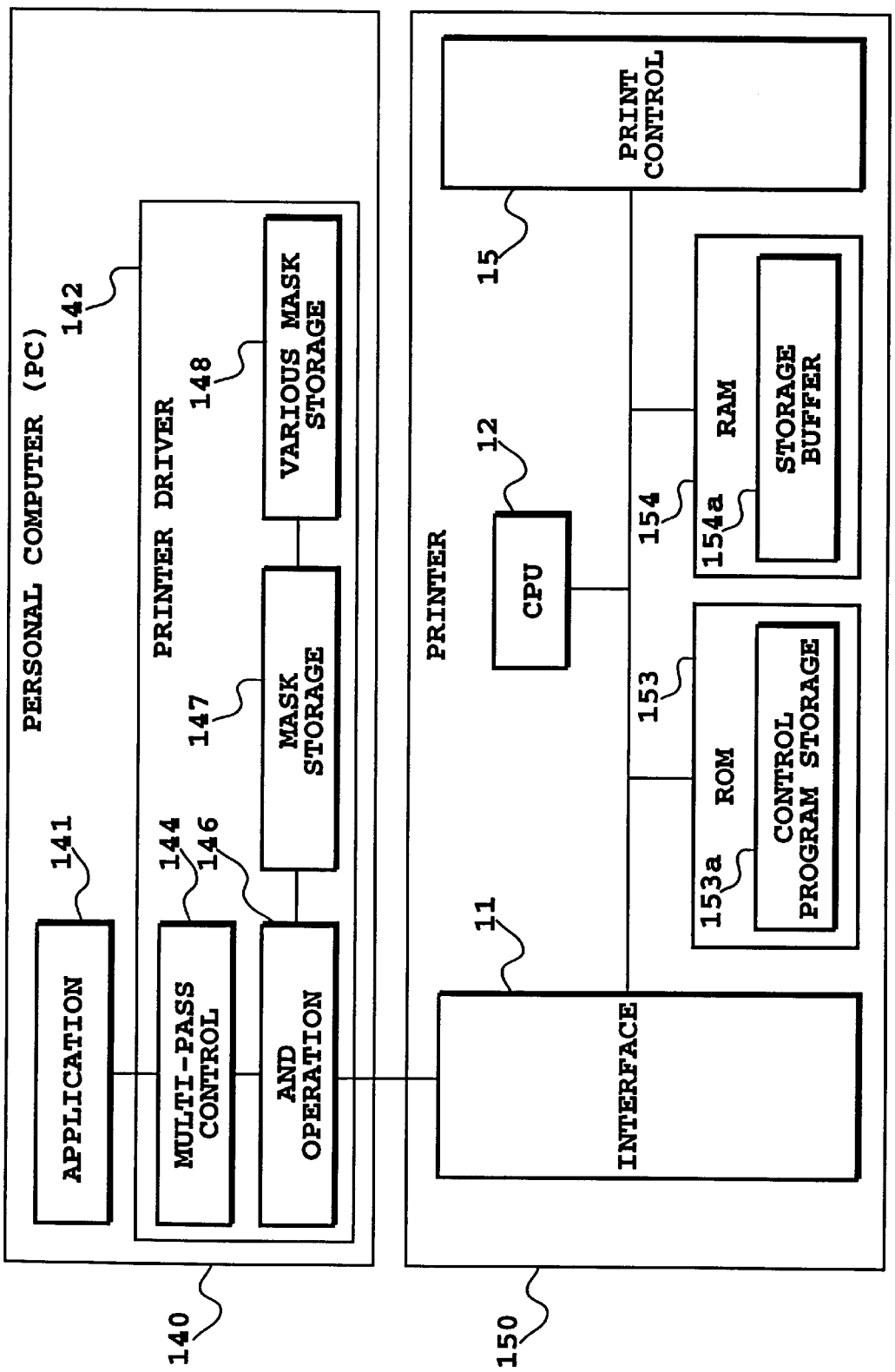
FIG. 14 is a block diagram showing a configuration of the fourth embodiment of the printing apparatus according to the present invention.

The shown embodiment exemplifies a case where a host computer is provided with thinning patterns and a thinning means inside. FIG. 14 is a block diagram showing a configuration of the fourth embodiment of a printing system according to the present invention. In FIG. 14, a printer driver 142 has particular components to the present invention.

In FIG. 14, the host computer(PC) 140 is a host machine to a printing apparatus 150, which outputs, for printing, files and so on generated by executing an application 141 to the printing apparatus 150 under control of the printer driver 142. The printer driver 142 has a multi-pass control unit 144, an AND operation unit 146, a printing mask storage unit 147 and a various printing mask storage unit 148. The various printing mask storage unit 148 preliminarily stores a plurality of printing masks, particular to the present invention as shown in FIGS. 7 and 10.

In the printing system with the configuration shown in FIG. 14, the printing operation described hereinafter will be performed.

The printer driver 142 is responsive to a printing instruction from the application 141 to retrieve a printing mask to be used in the current printing model among a plurality of printing masks in the various printing mask storage unit 148, and to store the retrieved printing mask in the printing mask storage unit 147.

Figure 4:
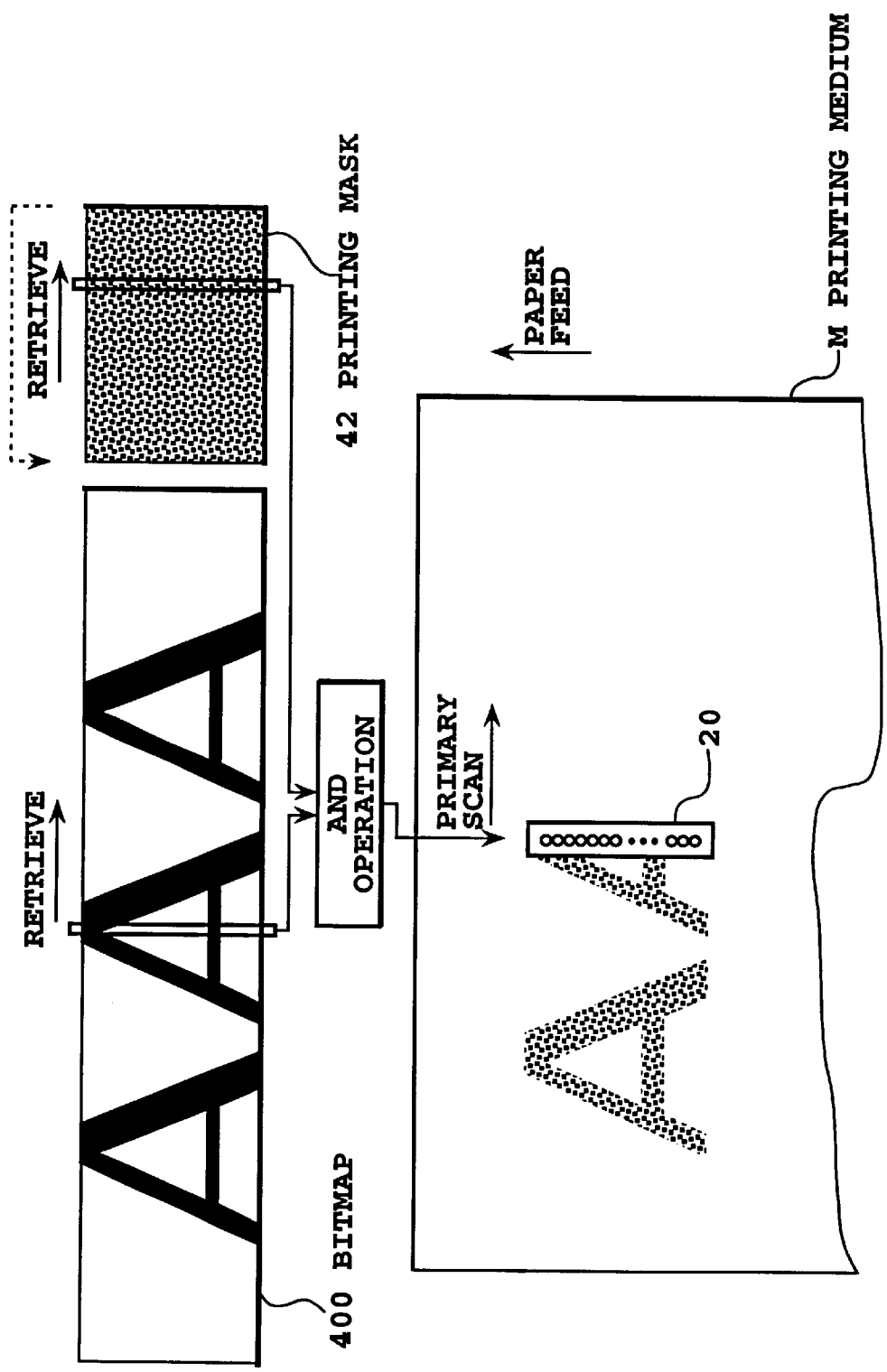
FIG. 4 is an explanatory illustration showing an operation of the print control unit of the conventional printing apparatus.

Subsequently, when printing data is transmitted to the printer driver 142 from the application 141, the multi-pass control unit 144 receives the printing data, and generates printing data for every one scan according to the printing mode on the basis of the received printing data. Then, the printing data for one scan is fed to the AND operation unit 146. In the AND operation unit 146, AND operation of the data for printing in one scan and data of the printing mask stored in the printing mask storage unit 147, as disclosed in connection with FIG. 4, is performed. This AND operation achieves thinning particular to the present invention, and the printing data resulting from the AND operation is transmitted to the printing apparatus 150.

In the printing apparatus 150, the CPU 12 operates according to the control program preliminarily stored in a control program storage area 153a prepared in a ROM 153, and controls the printing operation.

The printing apparatus 150 receives the data from the AND operation unit 146 via the interface 11 to store in a printing buffer 154a provided with a RAM 154. When data for one scan is accumulated in the printing buffer 154a, the printing operation for one scan is performed under control of the print control unit 15.

The printing operation and printing result to be accomplished by the system configuration incorporating the above-mentioned thinned pattern and the thinning means inside the host computer 140 are similar to those in the first and second embodiments. According to the above shown embodiment, further, a version up of the printer driver can achieves an improvement of the multi-pass printing method without any variation in the configuration of the main body of the printing apparatus 150, and the improvement yields reduction of the connecting stripes in the multi-pass printing process.

The present invention achieves distinct effect when applied to a recording head or a printing apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a printing medium. Such a recording head may consists of a plurality of recording heads combined together, or one integrally arranged recording head.

In addition, the present invention can be applied to various serial type recording heads: a recording head fixed to the main assembly of a printing apparatus; a conveniently replaceable chip type recording head which, when loaded on the main assembly of a printing apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the printing apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a printing apparatus can be also changed. For example, only one printing head corresponding to a single color ink, or a plurality of printing heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C. –70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the printing medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, in addition, as embodiments of the ink-jet printing apparatus according to the present invention, in addition to those employed as image output terminal of the information processing device of the computer and so forth, the present invention may further embodied in a form of copying apparatus as combined with reader or the like, facsimile apparatus as combined while transmitting and receiving function, or so on.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for printing an image by a printing head including a plurality of nozzles aligned in an auxiliary scanning direction, comprising:

an auxiliary scanning means for relatively moving said printing head and a printing medium substantially in the auxiliary scanning direction a predetermined distance;

a primary scanning means for relatively moving said printing head and the printing medium substantially in a direction different from the auxiliary scanning direction; and a printing control means for performing image printing by combining a plurality of thinned images printed based upon respective ones of plural kinds of thinning patterns including a first thinning pattern and a second thinning pattern, the respective patterns being substantially equal in length, in the auxiliary scanning direction, to the predetermined distance, wherein said printing control means performs image printing such that a plurality of first boundaries formed by bordering in the auxiliary scanning direction of a plurality of first thinned images printed by said primary scanning means during a plurality of primary scans based upon said first thinning pattern are located at different positions in the auxiliary scanning direction than a plurality of second boundaries formed by bordering in the auxiliary scanning direction of a plurality of second thinned images printed by said primary scanning means during a plurality of primary scans based upon said second thinning pattern.

2. A printing apparatus as claimed in claim 1, wherein said printing head has a thermal energy generating body for ejecting an ink from said plurality of nozzles with thermal energy from said thermal energy generating body.

3. A printing apparatus as claimed in claim 1, further comprising;

a storing portion for storing plural kinds of thinning patterns including said first thinning pattern and said second thinning pattern;

wherein said first thinning pattern and said second thinning pattern are stored with a predetermined interval therebetween such that said plurality of first thinned images printed based upon said first thinning pattern and said plurality of second thinned images printed based upon said second thinning pattern are formed at different positions in the auxiliary scanning direction, the positions being separated in the auxiliary scanning direction by an interval smaller than the predetermined distance.

4. A printing head including a plurality of nozzles aligned in an auxiliary scanning direction, said head being employed with a printing apparatus including an auxiliary scanning means for relatively moving said printing head and a printing medium substantially in the auxiliary scanning direction a predetermined distance, a primary scanning means for relatively moving said printing head and the printing medium substantially in a direction different from the auxiliary scanning direction, and a printing control means for performing image printing by combining a plurality of thinned images printed based upon respective ones of plural kinds of thinning patterns including a first thinning pattern and a second thinning pattern, the respective patterns being substantially equal in length, in the auxiliary scanning direction, to the predetermined distance, said printing head comprising:

a storing portion for storing said plural kinds of thinning patterns which produce a plurality of first boundaries formed by bordering in the auxiliary scanning direction of a plurality of first thinned images printed by said primary scanning means during a plurality of primary scans based upon said first thinning pattern at different positions in the auxiliary scanning direction than a plurality of second boundaries formed by bordering in the auxiliary scanning direction of a plurality of second thinned images printed by said primary scanning means during a plurality of primary scans based upon said second thinning pattern.

5. A printing head as claimed in claim 4, which further comprises a thermal energy generating body for ejecting an ink through said plurality of nozzles with thermal energy from said thermal energy generating body.

6. A printing head as claimed in claim 4,
wherein said first thinning pattern and said second thinning pattern are stored with a predetermined interval therebetween such that said plurality of first thinned images printed based upon said first thinning pattern and said plurality of second thinned images printed based upon said second thinning pattern are formed at different positions in the auxiliary scanning direction, the positions being separated in the auxiliary scanning direction by an interval smaller than the predetermined distance.

7. A head cartridge including a printing head having a plurality of nozzles aligned in an auxiliary scanning direction, said head cartridge being employed with a printing apparatus including an auxiliary scanning means for relatively moving said printing head and a printing medium substantially in the auxiliary scanning direction a predetermined distance, a primary scanning means for relatively moving said printing head and the printing medium substantially in a direction different from the auxiliary scanning direction, and a printing control means for performing image printing by combining a plurality of thinned images printed based upon respective ones of plural kinds of thinning patterns including a first thinning pattern and a second thinning pattern, the respective patterns being substantially equal in length, in the auxiliary scanning direction, to the predetermined distance, said head cartridge being formed by integrating said printing head and an ink tank, and said head cartridge comprising:
a storing portion for storing plural kinds of thinning patterns which produce a plurality of first boundaries formed by bordering in the auxiliary scanning direction of a plurality of first thinned images printed by said primary scanning means during a plurality of primary scans based upon said first thinning pattern at different positions in the auxiliary scanning direction than a plurality of second boundaries formed by bordering in the auxiliary scanning direction of a plurality of second thinned images printed by said primary scanning means during a plurality of primary scans based upon said second thinning pattern.

8. A head cartridge as claimed in claim 7, wherein said printing head has a thermal energy generating body for ejecting an ink from said plurality of nozzles with thermal energy from said thermal energy generating body.

9. A head cartridge as claimed in claim 7,
wherein said first thinning pattern and said second thinning pattern are stored with a predetermined interval therebetween such that said plurality of first thinned images printed based upon said first thinning pattern and said plurality of second thinned images printed based upon said second thinning pattern are formed at different positions in the auxiliary scanning direction, the positions being separated in the auxiliary scanning direction by an interval smaller than the predetermined distance.

10. A control method for controlling a printing apparatus including a printing head having a plurality of nozzles aligned in an auxiliary scanning direction, an auxiliary scanning means for relatively moving said printing head and a printing medium substantially in the auxiliary scanning direction a predetermined distance, a primary scanning means for relatively moving said printing head and the printing medium substantially in a direction different from the auxiliary scanning direction, and a printing control means for performing image printing by combining a plurality of thinned images printed based upon respective ones of plural kinds of thinning patterns including a first thinning pattern and a second thinning pattern, the respective patterns being substantially equal in length, in the auxiliary scanning direction, to the predetermined distance, said control method comprising a step of:
controlling said printing head to perform image printing such that a plurality of first boundaries formed by bordering in the auxiliary scanning direction of a plurality of first thinned images printed by said primary scanning means during a plurality of primary scans based upon said first thinning pattern are located at different positions in the auxiliary scanning direction than a plurality of second boundaries formed by bordering in the auxiliary scanning direction of a plurality of second thinned images printed by said primary scanning means during a plurality of primary scans based upon said second thinning pattern.

11. A control method as claimed in claim 10, further comprising a step of:
driving a thermal energy generating body provided with respective ones of said plurality of nozzles based upon respective image data to generate thermal energy for ejecting ink from said respective nozzles.

12. A printing apparatus comprising:
an auxiliary scanning means for relatively moving a printing head having a plurality of nozzles aligned in an auxiliary scanning direction and a printing medium substantially in the auxiliary scanning direction a predetermined distance;
a primary scanning means for relatively moving said printing head and the printing medium in a primary scanning direction different from the auxiliary scanning direction; and
a thinning means for thinning image data upon scanning a predetermined area of the printing medium with said printing head while relatively moving in the primary scanning direction, said thinning means comprising:
a means for generating a plurality of thinning patterns each having substantially the same ejection ratio and a length in the auxiliary scanning direction corresponding to the predetermined distance, which completes an image of the predetermined area by combining images formed with respective ones of said thinning patterns respectively, and
a shifting means for shifting said plurality of thinning patterns in such a manner that a plurality of boundary portions of images formed by respective ones of said thinning patterns located adjacent one another in the auxiliary scanning direction on the printing medium are located at different positions in the auxiliary scanning direction.

13. A printing apparatus as claimed in claim 12, wherein the different positions are located substantially at equal intervals by said shifting means shifting said plurality of thinning patterns by a given amount in a same direction with respect to the predetermined distance.

14. A printing apparatus as claimed in claim 13, wherein the same direction is a direction of forming a gap of respectively predetermined width between said plurality of shifted thinning patterns, and an ejection ratio in the gap is set to be smaller than said substantially the same ejection ratio.

15. A printing apparatus as claimed in claim 14, wherein said ejection ratio in the gap is set substantially to zero.

16. A printing apparatus as claimed in claim 13, wherein the same direction is a direction of forming an overlapping part of predetermined width formed by said plurality of shifted thinning patterns, and an ejection ratio in the overlapping part is set to be greater than said substantially the same ejection ratio.

17. A printing apparatus as claimed in claim 16, wherein said ejection ratio in the overlapping part is set to be substantially twice said substantially the same ejection ratio.

18. A printing apparatus as claimed in claim 15 or 17, wherein said thinning means comprises a means for preliminarily storing predetermined thinning patterns and a processing means for performing an operation on the basis of a predetermined program, said operation performed by said processing means generating said plurality of thinning patterns and shifting respective ones of said thinning patterns.

19. A printing apparatus as claimed in claim 18, wherein said printing head has a thermal energy generating body for ejecting an ink from said plurality of nozzles with thermal energy from said thermal energy generating body.

20. A printing apparatus as claimed in claim 19, wherein said thermal energy generating body is a heater driven based upon said image data.

21. A printing apparatus for printing an image by a printing head including a plurality of nozzles aligned in an auxiliary scanning direction, comprising:

an auxiliary scanning means for relatively moving said printing head and a printing medium substantially in the auxiliary scanning direction a predetermined distance;

a primary scanning means for relatively moving said printing head and the printing medium substantially in a direction different from the auxiliary scanning direction;

a storing portion for storing plural kinds of thinning patterns including a first thinning pattern and a second thinning pattern; and a printing control means for performing image printing by combining a plurality of thinned images printed based upon respective ones of the thinning patterns stored in said storing portion, said respective patterns being substantially equal in length, in the auxiliary scanning direction, to the predetermined distance;

wherein said storing portion stores plural kinds of thinning patterns which produce a plurality of first boundaries formed by bordering in the auxiliary scanning direction of a plurality of first thinned images printed by said primary scanning means during a plurality of primary scans based upon said first thinning pattern and a plurality of second boundaries formed by bordering in the auxiliary scanning direction of a plurality of second thinned images printed by said primary scanning means during a plurality of primary scans based upon said second thinning pattern, the plurality of first boundaries being formed at different positions in the auxiliary scanning direction than the plurality of second boundaries.

22. A printing method for printing an image for use with a printing apparatus comprising a printing head including a plurality of nozzles aligned in an auxiliary scanning direction, an auxiliary scanning means for relatively moving said printing head and a printing medium substantially in the auxiliary scanning direction a predetermined distance, a primary scanning means for relatively moving said printing head and the printing medium substantially in a direction different from the auxiliary scanning direction, and a printing control means for performing image printing by combining a plurality of thinned images printed based upon respective ones of plural kinds of thinning patterns including a first thinning pattern and a second thinning pattern, the respective patterns being substantially equal in length, in the auxiliary scanning direction, to the predetermined distance, said printing method comprising a step of:

performing image printing such that a plurality of first boundaries formed by bordering in the auxiliary scanning direction of a plurality of first thinned images printed by said primary scanning means during a plurality of primary scans based upon said first thinning pattern are located at different positions in the auxiliary scanning direction than a plurality of second boundaries formed by bordering in the auxiliary scanning direction of a plurality of second thinned images printed by said primary scanning means during a plurality of primary scans based upon said second thinning pattern.

* * * * *

UNITED STATES PATENT AND TRADEMARK OFFICE
CERTIFICATE OF CORRECTION

PATENT NO. : 6,478,394 B1
DATED : November 12, 2002
INVENTOR(S) : Akira Okamoto

It is certified that error appears in the above-identified patent and that said Letters Patent is hereby corrected as shown below:

Title page,
Item [57], ABSTRACT,
Line 8, "direction with" should read -- direction, and are --; and
Line 11, "direction," should read -- direction --.

Column 1,
Line 47, "becomes" should read -- become --; and
Line 49, "feeding error in constant" should read -- constant feeding error --.

Column 2,
Line 18, "accomplish" should read -- accomplish both --;
Line 19, "scan both." should read -- scan. --;
Line 48, "(1<x<8)." should read -- ($1 \leq x \leq 8$). --; and
Line 55, "with" should be deleted.

Column 3,
Line 11, "scan" (first occurrence) should read -- scanning -- and "scan" (second occurrence) should read -- scan, --;
Line 25, "that" should read -- what it --; and
Line 44, "employing with" should read -- employs --.

Column 4,
Line 20, "achieve rising up" should read -- accelerate --;
Line 42, "with respective of a plurality of" should read -- a plurality of respective --;
Lines 47 and 63, "of the" should be deleted; and
Line 66, "of the" should be deleted.

Column 5,
Line 4, "with" should be deleted;
Lines 25 and 28, "illustration" should read -- illustrations --; and
Line 65, "with" should be deleted.

Column 6,
Line 12, "interval." should read -- intervals. --;
Line 23, "(1<x<8)." should read -- ($1 \leq x \leq 8$). --;
Line 26, "process" should read -- process, --;
Line 39, "scan in all" should read -- scanning --;

UNITED STATES PATENT AND TRADEMARK OFFICE
CERTIFICATE OF CORRECTION

PATENT NO. : 6,478,394 B1
DATED : November 12, 2002
INVENTOR(S) : Akira Okamoto

It is certified that error appears in the above-identified patent and that said Letters Patent is hereby corrected as shown below:

<u>Column 6 cont'd,</u>
Line 40, "scan" should read -- scan, --;
Line 48, "are" should read -- is --; and
Line 57, "that" should read -- what it --.

<u>Column 7,</u>
Line 24, "above described" should read -- above-described --;
Line 29, "not perceptible for" should read -- imperceptible to --; and
Line 43, "certain" should read -- a certain --.

<u>Column 8,</u>
Line 12, "(1<x<8)." should read -- ($1 \leq x \leq 8$). --;
Line 14, "process" should read -- process, --;
Line 20, "occurs." should read -- occur. --;
Line 33, "times" should read -- scans, --;
Line 34, "of scan," should be deleted;
Line 35, "times of scan" should read -- scans --; and
Line 61, "that" should read -- what it --.

<u>Column 9,</u>
Line 19, "above described" should read -- above-described --;
Line 24, "not perceptible for" should read -- imperceptible to --; and
Line 38, "certain" should read -- a certain --.

<u>Column 11,</u>
Line 2, "achieves" should read -- achieve --.

<u>Column 12,</u>
Line 37, "to" should read -- into --; and
Line 55, "consists" should read -- consist --.

<u>Column 13,</u>
Line 52, "embodied" should read -- be embodied --.

<u>Column 14,</u>
Line 33, "comprising;" should read -- comprising: --; and
Line 36, "pattern;" should read -- pattern, --.

UNITED STATES PATENT AND TRADEMARK OFFICE
CERTIFICATE OF CORRECTION

PATENT NO.   : 6,478,394 B1
DATED        : November 12, 2002
INVENTOR(S)  : Akira Okamoto It is certified that error appears in the above-identified patent and that said Letters Patent is hereby corrected as shown below:

<u>Column 15,</u>
Line 13, "whererin" should read -- wherein --.

Signed and Sealed this

Fifteenth Day of July, 2003

JAMES E. ROGAN
*Director of the United States Patent and Trademark Office*